US012286764B2

(12) United States Patent
Selgas et al.

(10) Patent No.: US 12,286,764 B2
(45) Date of Patent: Apr. 29, 2025

(54) FOUNDATION MONITORING SYSTEM

(71) Applicants: Thomas D. Selgas, Athens, TX (US); Antonio Savarese, Arlington, TX (US)

(72) Inventors: Thomas D. Selgas, Athens, TX (US); Antonio Savarese, Arlington, TX (US)

(*) Notice: Subject to any disclaimer, the term of this patent is extended or adjusted under 35 U.S.C. 154(b) by 0 days.

(21) Appl. No.: 17/930,702

(22) Filed: Sep. 8, 2022

(65) Prior Publication Data

US 2023/0183935 A1    Jun. 15, 2023

Related U.S. Application Data

(60) Provisional application No. 63/241,827, filed on Sep. 8, 2021.

(51) Int. Cl.
| | |
|---|---|
| *G01C 9/08* | (2006.01) |
| *E02D 33/00* | (2006.01) |
| *G01C 9/04* | (2006.01) |
| *G01C 9/06* | (2006.01) |

(52) U.S. Cl.
CPC ............ *E02D 33/00* (2013.01); *G01C 9/04* (2013.01); *G01C 9/06* (2013.01); *G01C 9/08* (2013.01); *E02D 2600/10* (2013.01); *G01C 2009/066* (2013.01)

(58) Field of Classification Search
CPC ....... E02D 33/00; E02D 2600/10; G01C 9/04; G01C 9/06; G01C 9/08; G01C 2009/066
See application file for complete search history.

(56) References Cited

U.S. PATENT DOCUMENTS

| | | | | |
|---|---|---|---|---|
| 5,430,953 | A  * | 7/1995 | de Souza | G01B 7/004 |
| | | | | 33/787 |
| 8,015,865 | B2 * | 9/2011 | DeFilipp | E02D 27/42 |
| | | | | 416/61 |
| 10,416,019 | B2 * | 9/2019 | Jaeger | G01F 23/20 |
| 10,526,763 | B2 * | 1/2020 | Conner | E02D 31/06 |
| 10,808,374 | B2 * | 10/2020 | Niezrecki | G01B 21/10 |
| 11,438,740 | B2 * | 9/2022 | Hill | H04W 4/38 |
| 11,614,326 | B2 * | 3/2023 | Drewett | G01C 9/08 |
| | | | | 33/333 |
| 2010/0238027 | A1 * | 9/2010 | Bastianini | H04Q 9/00 |
| | | | | 702/34 |
| 2010/0307017 | A1 * | 12/2010 | Saito | E02D 15/10 |
| | | | | 33/366.11 |
| 2011/0012728 | A1 * | 1/2011 | McCane | G01S 19/14 |
| | | | | 33/366.12 |

(Continued)

FOREIGN PATENT DOCUMENTS

| | | | | | |
|---|---|---|---|---|---|
| CN | 109186543 | A  * | 1/2019 | | G01C 5/00 |
| CN | 214173230 | U  * | 9/2021 | | G01B 21/04 |
| CN | 116657668 | A  * | 8/2023 | | |

*Primary Examiner* — Yaritza Guadalupe-McCall

(57) ABSTRACT

The present invention comprises a system for monitoring the angular movement of a structure's foundation, wall, beam and/or column with one or more monitoring devices in communication with either a local computing device (a hub) that displays the current angular deviation and direction from an initialized state, a remote server capable of generating a web page display of the current angular deviation and direction from an initialized state, or both. Additionally, the hub can be connected to the internet where data from the monitoring devices it is in communication with can be shared with a remote monitoring service, off-site server or both.

17 Claims, 14 Drawing Sheets

(56) References Cited

U.S. PATENT DOCUMENTS

| | | | |
|---|---|---|---|
| 2017/0160243 A1* | 6/2017 | Zhang | G01N 29/2412 |
| 2018/0100282 A1* | 4/2018 | Vuyk, Jr. | E02D 27/08 |
| 2021/0010896 A1* | 1/2021 | Jalabert | G01M 5/0008 |
| 2022/0235532 A1* | 7/2022 | Vuyk, Jr. | E02D 33/00 |
| 2023/0183935 A1* | 6/2023 | Selgas | E02D 33/00 33/343 |

* cited by examiner

Monitoring Device with M-board

Monitoring Device with E-board

Assembled Monitoring Device

Monitoring Device with E-board connected
to Sensor Cartridge via flat cable

M-Board and Locating Pins

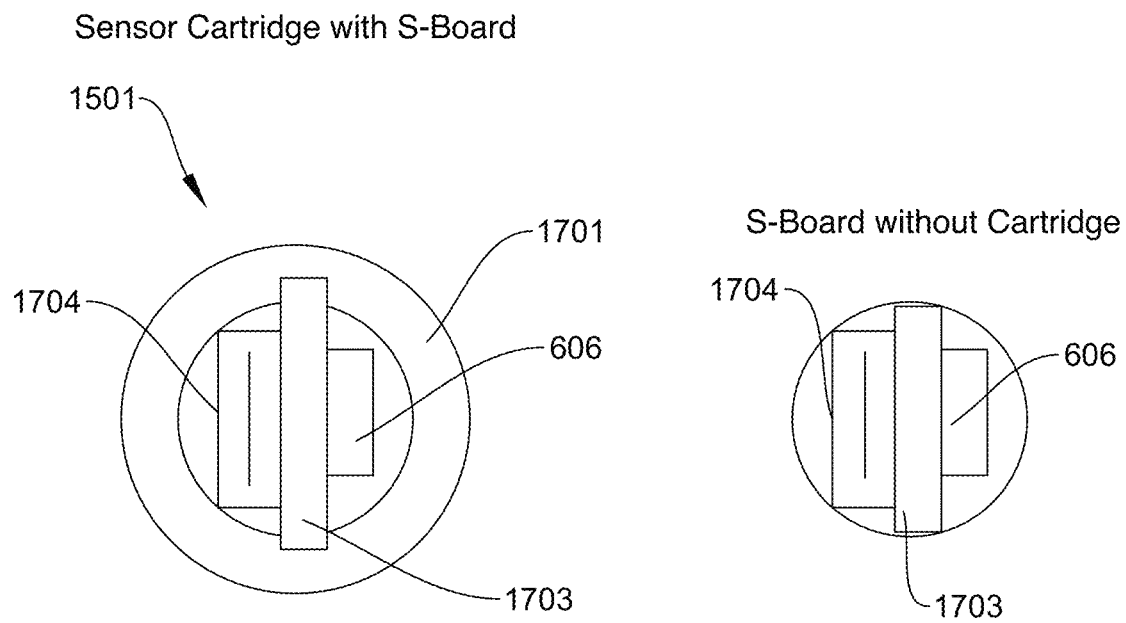
FIG. 17
FIG. 18
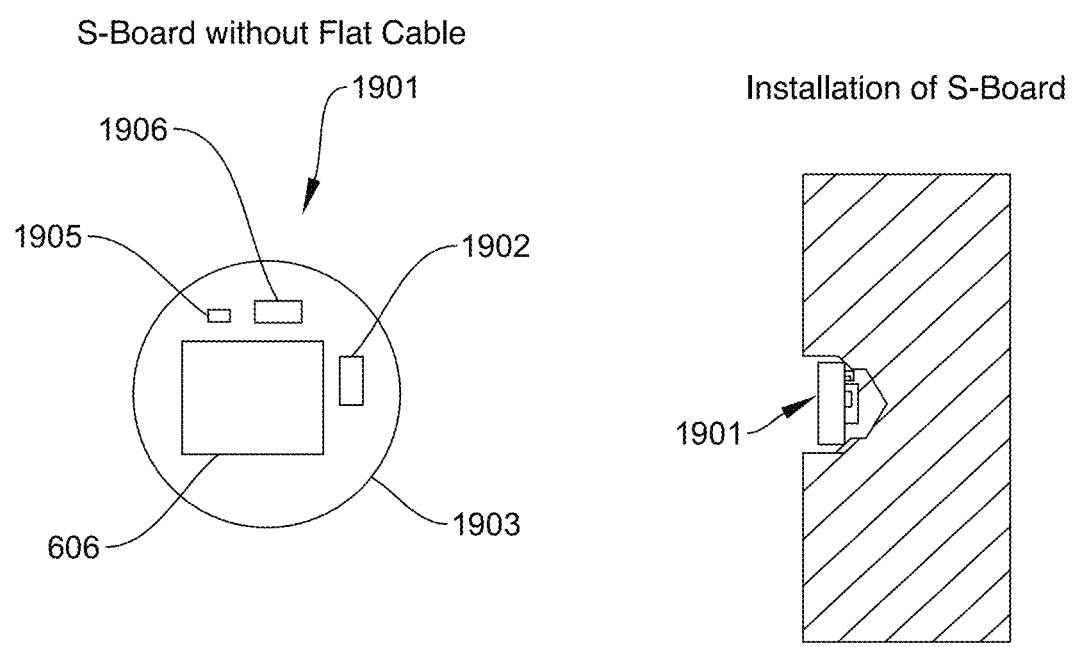
FIG. 19
FIG. 20

FOUNDATION MONITORING SYSTEM

CROSS-REFERENCE TO RELATED APPLICATION

This application claims the benefit of the filing date of U.S. provisional patent application Ser. No. 63/241,827, filed Sep. 8, 2021, the disclosure of which is hereby incorporated by reference for all purposes.

BACKGROUND OF THE INVENTION

Field of the Invention

The present disclosure generally relates to a new apparatus for monitoring the movement and bending of new or repaired structures' foundation, wall, beam and/or column.

Description of the Related Art

Much of the earth's surface has soils that are unstable and cause stress on the foundation of buildings which increase over time. This results in billions of dollars in damage and foundation repairs. In areas particularly susceptible to this problem, there are foundation repair companies advertising on a regular business, and to compete they offer warrantees for their work. If the movement is caught early, repair costs are substantially less. If left unaddressed the foundation damage could be very extensive. Also, after repair, the foundation company has a concern that the newly installed piers may not be in what initially appeared to be stable ground and allowing movement to continue. This could be when a pier is driven into large roots which later rot, or some other sort of issue that was not detected. Since most foundation repair companies offer guarantees there is a need to monitor foundations, even after repairs are made.

Currently, existing structural monitoring systems are not used on residential homes because they are either too expensive, complicated, and unsuitable. Also, they are complicated and have vulnerabilities. Some had limitations as compared to the apparatus being disclosed now. All these issues are eliminated with the disclosed apparatus.

For example, the invention of U.S. Pat. No. 5,191,713, measures angular position only, and applied to a machinery platform on a ship that requires continuous readings. Also, it is being applied only to machinery, rather than a building structure that has different issues and behavior, such as slow limited movement or bending.

The invention of U.S. Pat. No. 5,774,376 requires an actuator to excite the sensors to detect cracks in the foundation. This requires lots of energy, is complicated, and not easy to analyze tilt or displacement. In the application that this disclosure addresses, the cracks would already exist, and it is its movement that is now important.

The invention in U.S. Pat. No. 6,449,857 uses fluids which can leak or be toxic. This requires electrodes, making the device large, cumbersome, and susceptible to damage. It also requires heating systems which uses a lot of energy.

The invention in US20220235532 requires a tube or raceway attached to the foundation, with sensor cartridges inside. It is complicated, expensive, and hard to install.

The invention in U.S. Pat. No. 9,267,862 is for measuring dynamic loads of a bridge to detect damages from impacts or other loss of structural integrity. It requires two types of sensors to verify valid data, and each sensor must be wired to a central controller and do not operate independently. Their device also requires accelerometers in addition to tilt sensors which must be continually powered and measuring vibration to ensure there is no event that overloads and damages the sensors.

SUMMARY OF THE INVENTION

The present invention generally relates to systems, apparatus, and methods for monitoring foundations. Since most of the demand for such a monitoring system would be some time after building construction is complete, simple inexpensive device[s] on the outside of the foundation are needed which would be easy to setup and install. This is not happening, because a simple inexpensive device is not currently available. The disclosed apparatus is a small simple electronic monitoring device that that would measure change in angle at the point on the foundation it is attached to. A system may consist of more than one monitoring device 302. For power, each device would be powered by its own battery 1203 which uses its own solar panel 1201 to maintain a charge. It could also be equipped with a radio 603, 604 to transmit data. The overall device, including one with a radio, would be held together with a single bracket 1205/1302 that mounts to the foundation FIG. 12 thru FIG. 15. After assembly it is smaller than 9 square inches. Each assembly works independently. Since each have their own power source and radio, there is no wiring, tubing, or other hardware required to be installed between each measurement point. Each installed monitoring device measures the angular position at the mounting point on a foundation. Only one type of monitoring device is required, and data is measured in periodic bursts. Each burst is a series of angular measurements taken at some frequency which are averaged and compared to historical data to determine if the data is valid. That would be the current angular position at that mounting point. Another parameter to determine the data validity is the deviation of the readings within a measurement burst.

Alternatively, the critical sensor portion of the circuit could be a separate part that is inserted and fixed into a counterbored hole on the foundation FIGS. 17 thru 20. That would protect its original mounted position from being disturbed if the device is hit by a lawn mower, weed wacker, or other maintenance operation. The inserted sensor would have a flat connector 1704 or something similar such as a USB-C connector that connects it to the supporting electronics 1301. When the supporting electronics portion 1301 of the monitoring device is accidently knocked off the foundation, the cable 1502 slips out of the connector at either end, leaving the setup of the sensor 606 undisturbed. The supporting electronics are then reconnected or replaced and attached to the foundation without any need to reset the sensor position. Attachment could be a snapping feature onto the rim of a shell 1701 that houses the sensor in the counterbored hole.

The system consists of one or more monitoring devices 302 fixed to the foundation that can alert the homeowner, building owners, civil engineers, and/or other foundation professionals what the structure's movement or current position is.

Unlike other applications of tilt sensors in use, this application will have a very small range of movement and would not experience vibration that could damage other type sensors. This is an issue for other applications, like machinery, robots, and bridges that may experience shock or much higher vibrations. They must continuously monitor acceleration to capture an event that would raise concern of the sensor's integrity. They require both a tilt sensor and an accelerometer. For this invention, a single sensor type would be enough, and the readings could be verified as described above in reference to measurement bursts. Also, since acceleration need not be continuously measured to capture an overload event, the device can be put to sleep between measurement bursts, conserving power and reducing the required power capacity.

In one embodiment, an LED 602 on the device could serve as an indicator that will light when the position of the foundation reaches a pre-set limit.

In another embodiment, there are multiple sensor devices that talk to each other by wired or wireless communication. And comparing the angle readings from different sensors located at different parts of the foundation, it can be determined if the structure is bending.

In another embodiment, there could be a CCD camera or other targeting sensor that looks at another sensor device to determine if there is any shearing of the foundation.

The preferred embodiment would be multiple sensor devices 302 each with wireless communication that talk to a central hub 301 that collects and analyzes the information. That hub 301 could have a graphic display 707 that displays a representation FIGS. 1 & 2 of the foundation's movement, change in shape, and stress. Or it can transmit that data to an off-site server 502 that can be accessed by the property owner or a foundation contractor via a smartphone app or web browser.

Terminology

For purposes of this document, the following terminology is used:
- X-axis: An axis represented by a unit vector in geometric space that is defined by a perfectly horizontal vector and is perpendicular to the gravity vector.
- Y-axis: An axis represented by a unit vector in geometric space that is defined by a perfectly horizontal vector that is at exactly 90 degrees from the X-axis and is perpendicular to the gravity vector.
- Z-axis: An axis represented by a unit vector in geometric space that is defined by a perfectly vertical vector and is parallel to the gravity vector.
- XY-Plane: The geometric plane containing both an X-axis and Y-axis having the same origin, and in which the Z-axis is normal to it.
- YZ-Plane: The geometric plane containing both a Y-axis and Z-axis having the same origin, and in which the X-axis is normal to it.
- ZX-Plane: The geometric plane containing both a Z-axis and X-axis having the same origin, and in which the Y-axis is normal to it.
- S-Chip: This is an Angle Sensing Device based on Micro Electromechanical Silicon (MEMS) which has at least one measuring axis.
- Measuring Axis: An axis of the S-Chip that is defined by a unit vector, which the S-Chip compares to the Z-axis when reporting an angle value.
- A-axis: The first measuring axis of the S-Chip. If the S-Chip has more than one measuring axis, then the A-axis is the one closest to being parallel to the plane defined by its mounting surface.
- B-axis: The second measuring axis of the S-Chip. If the S-Chip has more than two measuring axes, then the B-axis is the one other than the A-axis that is the next closest to being parallel to the plane defined by its mounting surface and not parallel to the A-axis.
- C-axis: The third measuring axis of the S-Chip. If said device has more than three measuring axes, then the C-axis is the one that is the most perpendicular to the plane defined by its mounting surface.
- S-Board: A printed circuit board 1703/1903 with an S-Chip 606 installed on it and having either a set of copper pads or a multi-conductor connector 1704 to electronically interface with other circuitry 1301 required to relay the output of the S-Chip 606.
- Sensor Cartridge: The cartridge consists of a strong shell 1701 that contains an S-Board 1703. The shell material would be something having a similar thermal coefficient of expansion as the foundation material into which it is installed. For example, a steel shell 1701 for a concrete foundation.
- E-Board: A printed circuit board that has the components needed to regulate power 607 and process data received from an S-Board 1703 or Sensor Cartridge 1501. The connection to the S-Board 1704/1901 or Cartridge 1501 would be with spring finger connectors, a flat cable 1502, or other direct connection. Indicators on the E-board 602 would be set conditionally based on the data read from the S-Board 1703 or Cartridge 1501. In addition, or alternatively, other components on the E-board would relay data to a Local-Hub 301 or the internet by wired or wireless connection 604.
- M-Board: A printed circuit board 601 with an S-Chip 606 installed on it, as well as all the other components needed to regulate power 607 and process 603 data produced by the S-Chip 606. Indicators on the board 602 would be set conditionally based on the data produced by the S-Chip 606. In addition, or alternatively, other components on the board 603 would relay data to a Local-Hub 301 or the internet by wired or wireless connection 604.
- Monitoring Device: A complete independent senor assembly consisting of a mounting frame 1202, Bracket 1205, solar panel 1201, battery 1203, and M-Board 1204 that is mounted onto the point of interest of the foundation. In place of the M-Board 1204, an E-Board 1301 may be used which connects to either an S-Board 1703/1901 or Sensor Cartridge 1501 embedded into the foundation at the point of interest.
- Monitoring System: A plurality of Monitoring Devices, each mounted on a point of interest in the foundation, whereby the Monitoring Devices 302 are interacting with each other, or they interact with a local-Hub 301. Alternatively the Monitoring Devices 302 could be connected directly to the internet and transmitting its ID, and the value measured for each Measuring Axis.
- Local-Hub: A computing device 701 dedicated to a building site that has a foundation and communicates with all the Monitoring Devices 302 mounted onto that foundation. The Local-Hub 701 would periodically receive the measurement data from each Monitoring Device 302, as well as that device's MAC address. The Local-Hub 701 would add a time stamp and store the raw data into a database located in its non-volatile memory 702. If the Local-Hub is connected to the internet, the contents of its database may be entered into a remote database 402 hosted on a server that contains data for all the foundations. Therefor the Local-Hub 301 could be configured with a display to show the data or condition of the foundation, send the data to a remote computing device for that purpose, or both. The display 707 would be painted with a graphical representation FIGS. 1 & 2 of a foundation footprint with Badges 204 around it showing the movement or bending of each part or edge of that foundation.

Badge: A graphic representation of the data contained in the database and displayed FIG. 1 or FIG. 2 on a Local-Hub 301 or a remote device. A Badge 114 based on one Monitoring Device 302 would represent the magnitude and direction of tilt at a point on the foundation where the Monitoring Device 302 was mounted. A Badge 204 based on two Monitoring Devices, would also represent the magnitude and direction of bending between a pair of Monitoring Devices 203. A Badge has an oval shape having a number inside it that represents the magnitude of the tilt or bending since installation. That number is scaled to units of interest and based on the data received from the Monitoring Devices after it is compared to its value at the time of installation. The lines extending from both ends of the oval represent the direction of tilt or bending. When the lines are horizontal 103, then that area of the foundation has not changed since the Monitoring Devices were installed. When the lines are not horizontal but still parallel 114, then that point of the foundation has tilted out of its XY-Plane. When the lines are not parallel 204, that area of the foundation is bent. The color of the Badge represents the alarm status for the foundation based on the received data. For example, Green=Normal, Yellow=Warning, Red-out of limits. When communication from all monitoring devices 302 associated with a badge 102 is lost, there would be no tick lines, and the magnitude would be displayed as " . . . ". When only one of two monitoring devices 302 associated with a badge 202 is lost, the tick on that side of the badge is replaced with an "X". The Badge in the legend 101/201 is a copy of the badge having the greatest change.

Database: The database would include a table that contains a record for each Monitoring Device 302 that contains fields to store their parameters entered at the time of installation. Those parameters would consist of at least its MAC address, location on the foundation, and the initial readings at the time of install. Additional fields may be used to store calibration info, version number, install date, serial number, or any other useful reference information. Another table would be used to store the readings from each monitoring device 302, including the readings from each or their axes. A remote database would also include an index table that identifies which foundation each Monitoring Device is associated with.

BRIEF DESCRIPTION OF THE DRAWINGS

For a more complete understanding of the present invention and the advantages thereof, reference is now made to the following Detailed Description taken in conjunction with the accompanying drawings, in which:

FIG. 16 illustrates how an M-Board 1204 is attached to a Bracket 1205, and seated against reference pins 1603 described above.

FIG. 17 illustrates the end view of a Sensor Cartridge 1501.

FIG. 18 illustrates the installation of an S-Board 1703 installed in a foundation without a cartridge.

FIG. 19 and FIG. 20 illustrates a different type and installation for an S-Board 1901 whereby connection to the E-Board 1301 would be by spring fingers rather than a cable 1502. The exposed side of the S-Board 1901 would have concentric circular copper pads, and the spring finger connectors would be added to the bottom of the E-Board 1301.

DETAILED DESCRIPTION

In the following discussion, specific details are set forth to provide a thorough understanding of the present invention. However, those skilled in the art will appreciate that the present invention may be practiced without such specific details. Additionally, for the most part, specific details and the like have been omitted since such details are not considered necessary to obtain a complete understanding of the present invention, and are within the understanding of persons of ordinary skill in the relevant art.

I. Introduction

Figure 1:
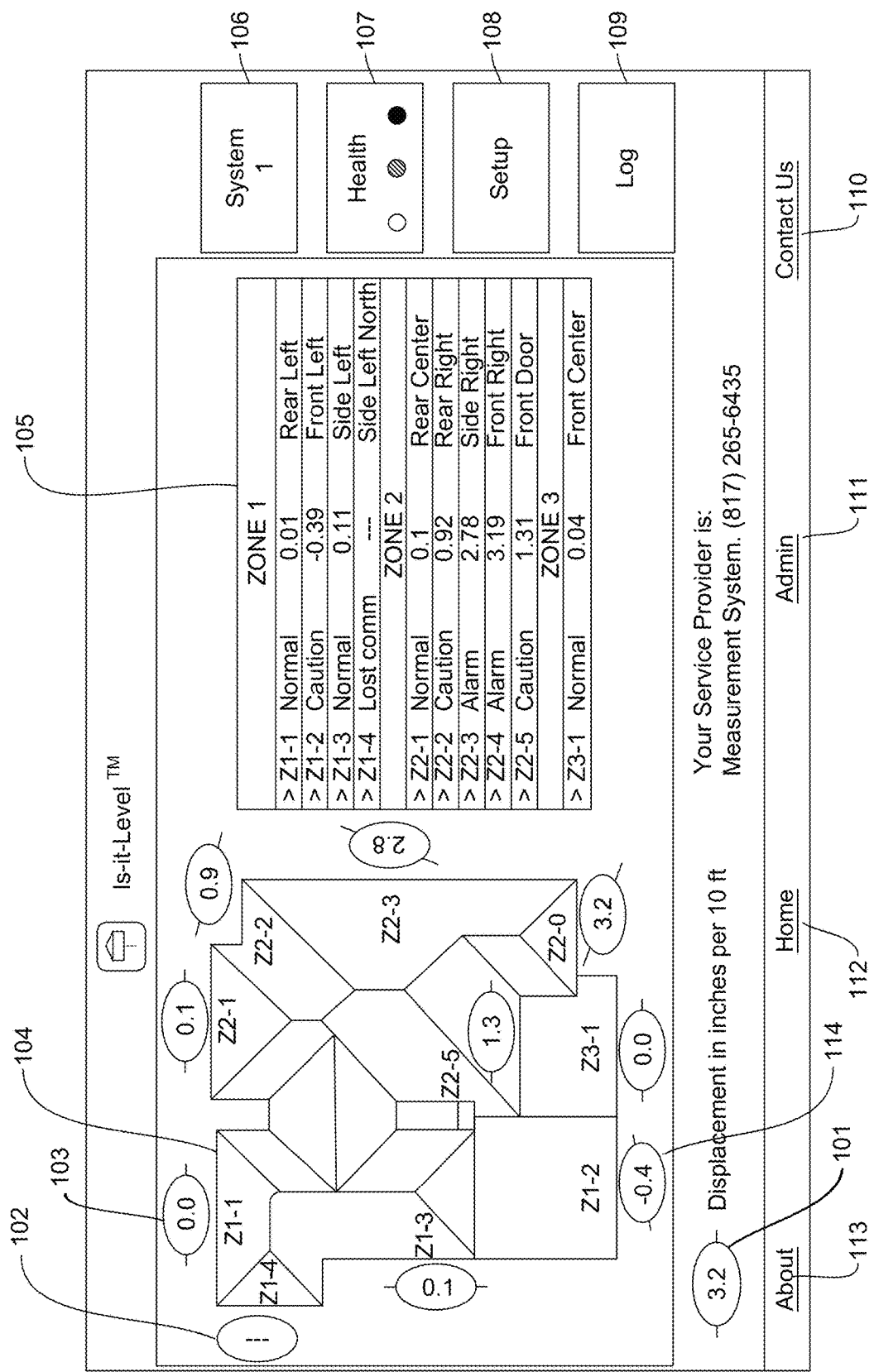
FIG. 1 illustrates a hub's display showing an arial view of a multi-faceted house which has been equipped with 10 Monitoring Devices attached around various edges of the foundation. The tilt amount of each edge of the foundation is shown by the Badge 114 displayed for that edge with tick lines showing the direction of movement. The number in the Badge indicates the magnitude of tilt. The color of the badge indicates the alarm status. More detail 105 is displayed for each of the Monitoring Devices, for example its identifier, location, and output after pressing the "Health" button 107.
Figure 2:
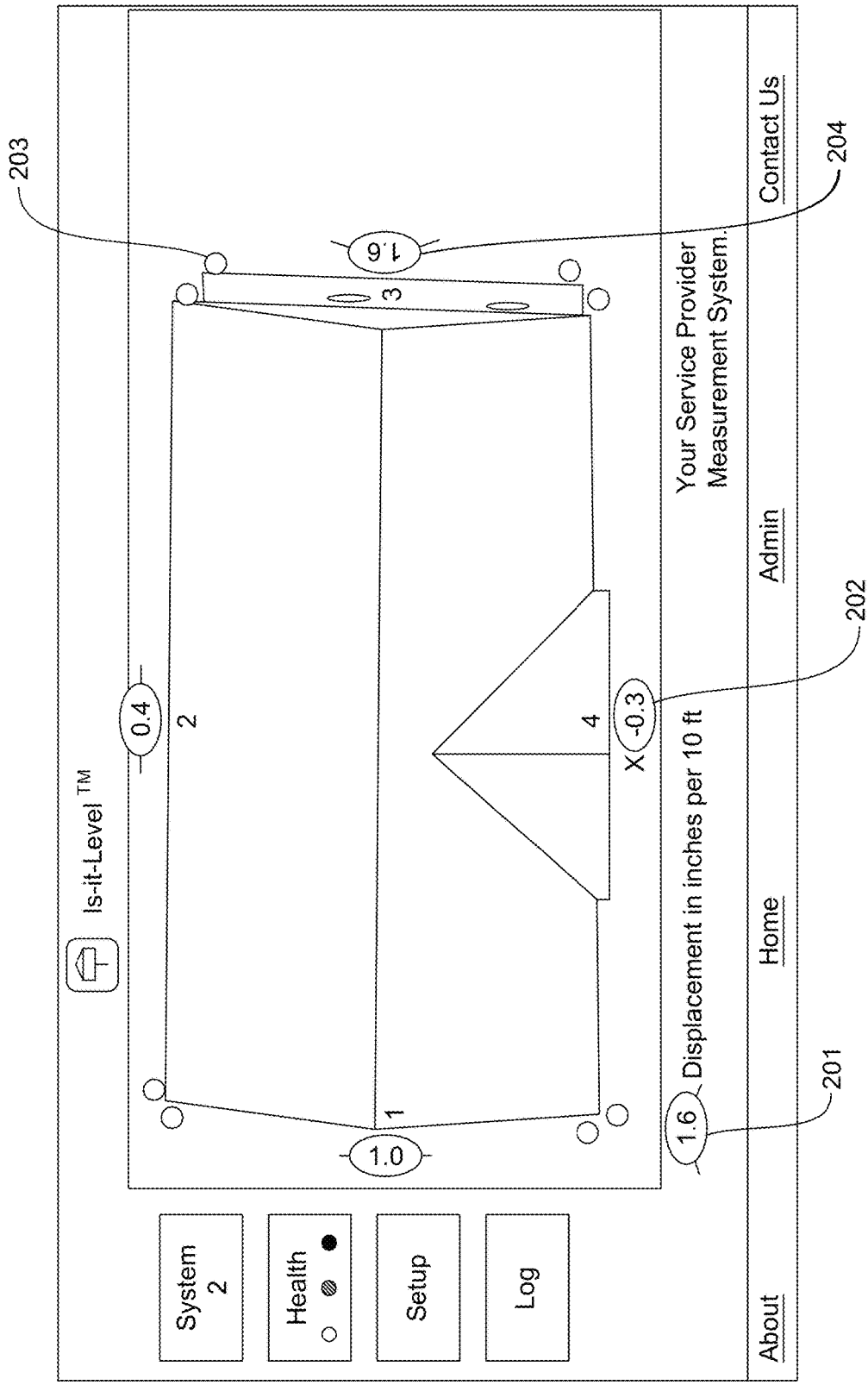
FIG. 2 illustrates a hubs display showing an arial view of a four-sided house that is equipped with either 8 single access Monitoring Devices 203 attached near the end of each side, or four 2-axis Monitoring Devices attached near each corner (not shown). The amount of tilting or bending of each edge of the foundation is shown by the Badges 204 displayed at the locations between each pair of Monitoring Devices 203. The tick lines show the direction of movement or bending of the foundations edge, relative to the XY-Plane.
Figure 3:
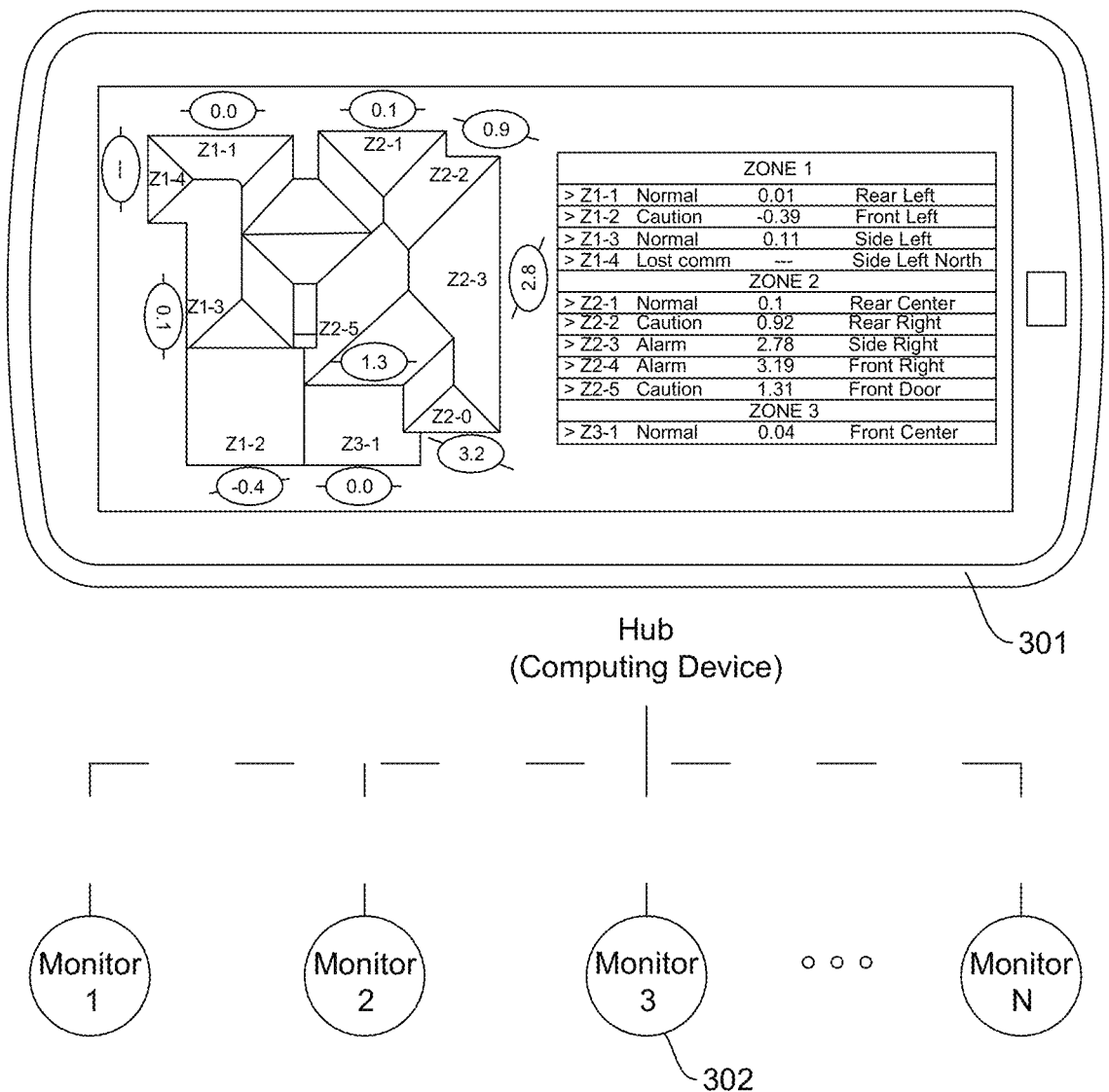
FIG. 3 illustrates a Home Foundation Monitoring System in the local configuration (i.e., without a connection to a remote database or other remote service on the internet), which is only viewable to someone onsite.
Figure 4:
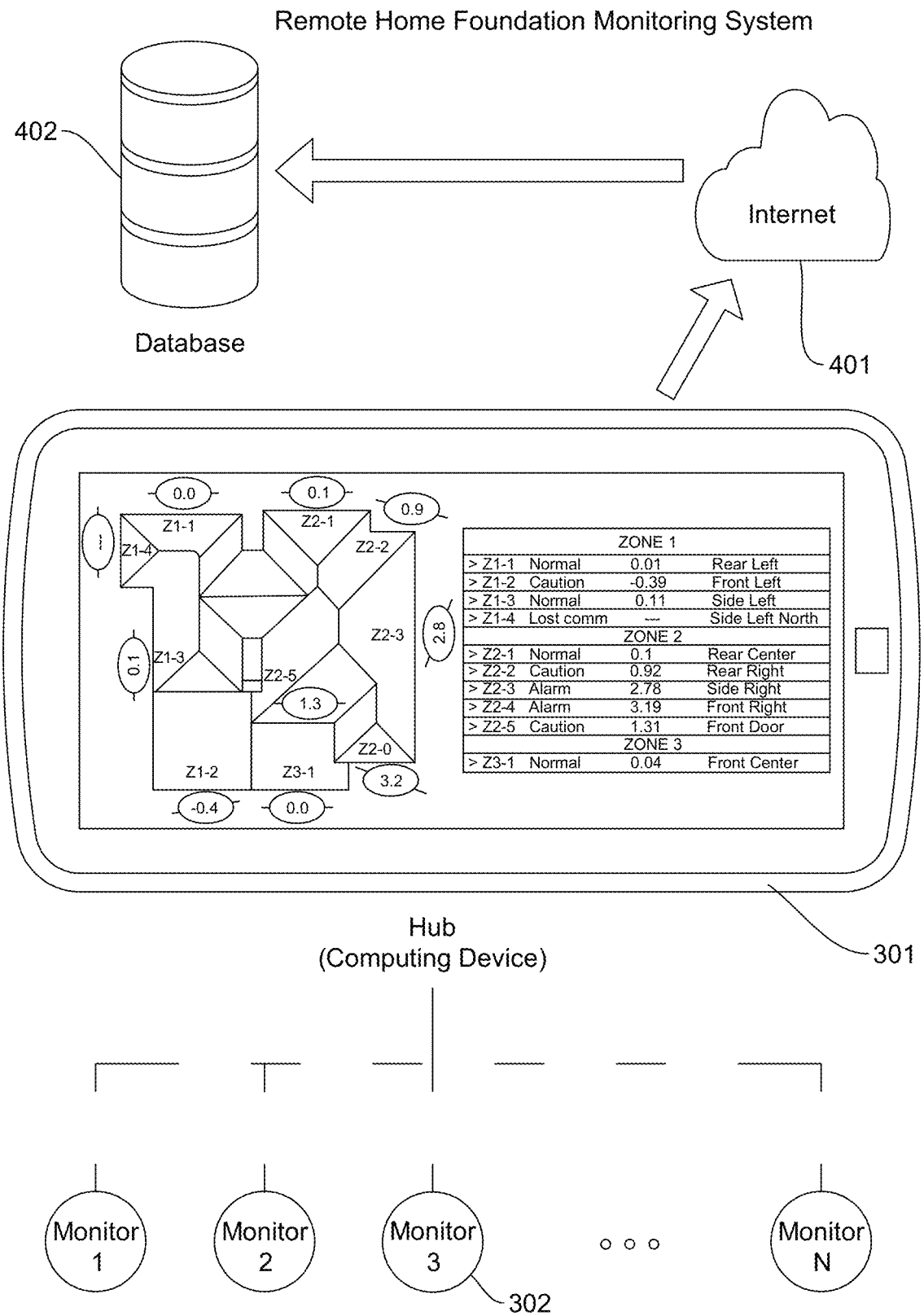
FIG. 4 illustrates a remote home foundation Monitoring System in the global configuration (i.e., with a connection to a remote database or other remote service on the internet), which is viewable to those on-site, to credentialed users over the internet, or both.
Figure 5:
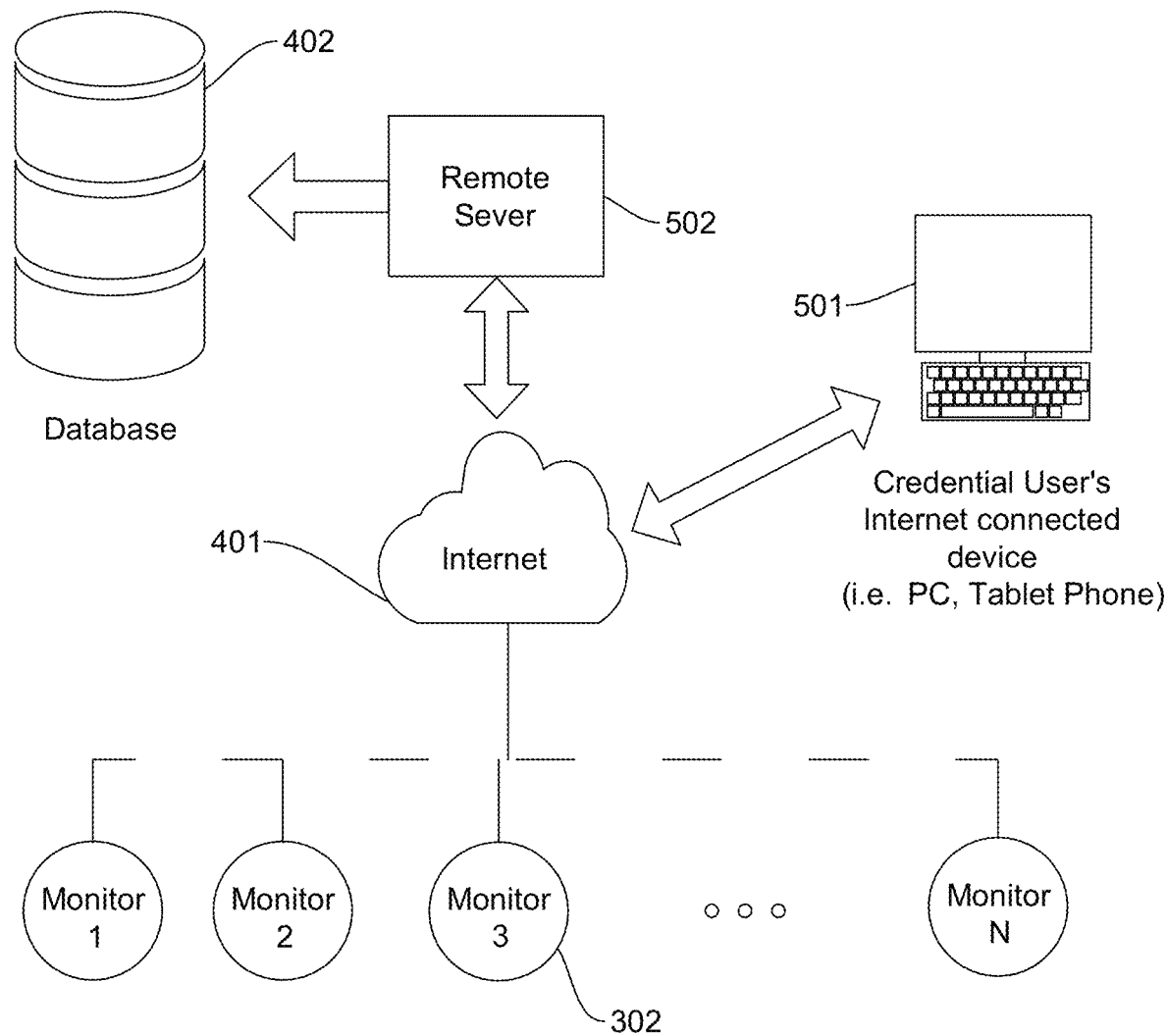
FIG. 5 illustrates an Internet of Things (IoT) home foundation Monitoring System which uses Monitoring Devices 302 that connect directly to a remote database or other remote service on the internet and is viewable to credentialed users through an App or Web Browser.
Figure 6:
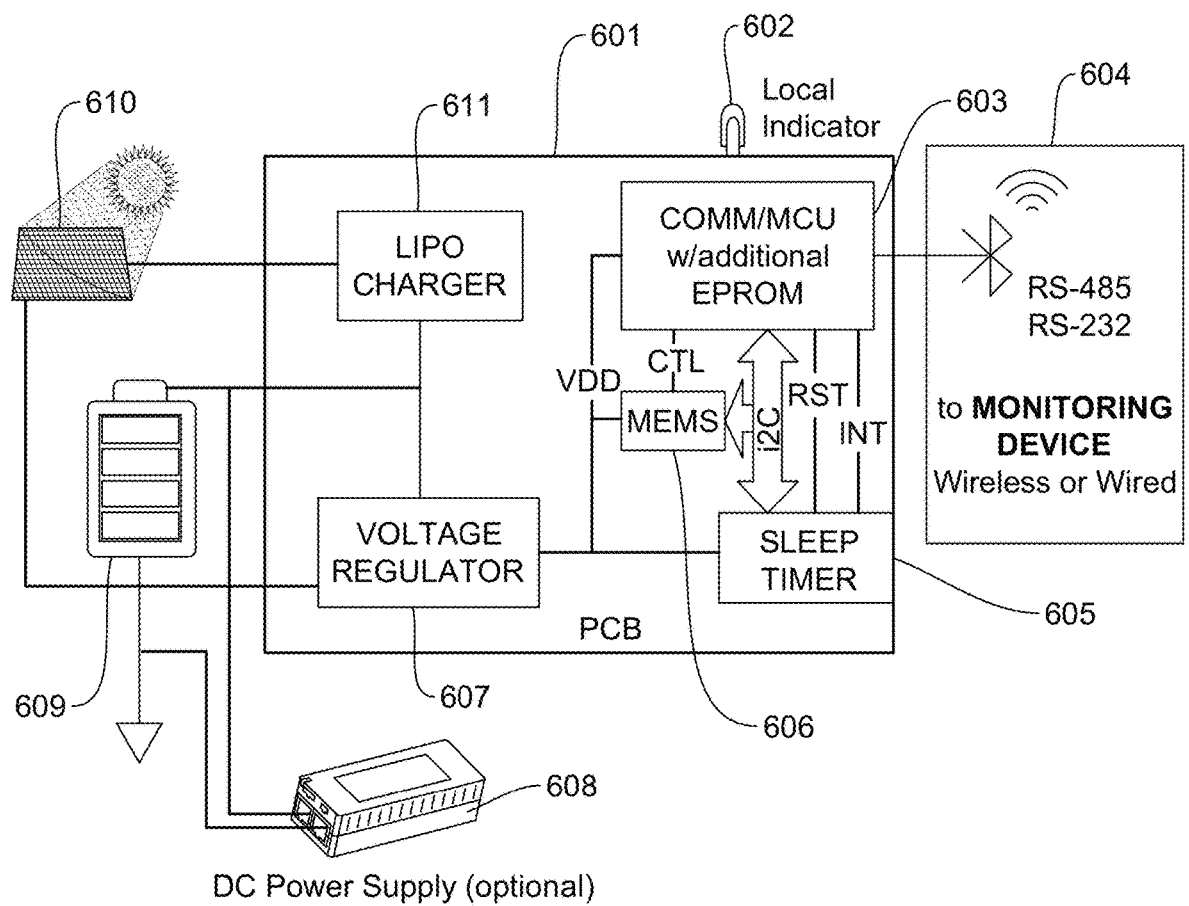
FIG. 6 illustrates the functional blocks of a monitoring device that would communicate with a Local-Hub 301. Not shown is the mounting frame. In this example the PCB 601 shown represents an M-Board 1204 that is equipped with an interface 604 to a Local-Hub 301. The DC Power Supply 608 is optional or would be temporarily connected for initial charging of the battery 609. On this M-board, there is a sleep timer 605 that will shutdown the MCU 603, Radio 604, and S-Chip 606. In that state the power drain is negligible compared to charging 611 of the battery 609 during sunlight hours. The period of the sleep timer 605 is either preset or set by a parameter provided by the Local-Hub 301. When the sleep timer 605 wakes up the components on the M-Board, the S-Chip 606 sends readings for each of its measuring axes to the COMM/MCU 603, which transmits that information to the Local-HUB 301 via the Radio 604. Once the data is transmitted, the MCU 603 triggers the sleep timer to activate and put the M-Board back to sleep. This conserves energy, particularly if a low energy radio is used. This allows the battery 609 to contain a long reserve of power that spans any anticipated lack of charging via solar panel 610 due to long periods of adverse weather. An optional indicator 602 could be part of the monitoring device. In this case the MCU 603 would process the data received from its S-Chip 606, compare it to data stored in the non-volatile memory of the MCU 603, and then activate the indicator 602 with the correct color depending an the alarm status.
Figure 7:
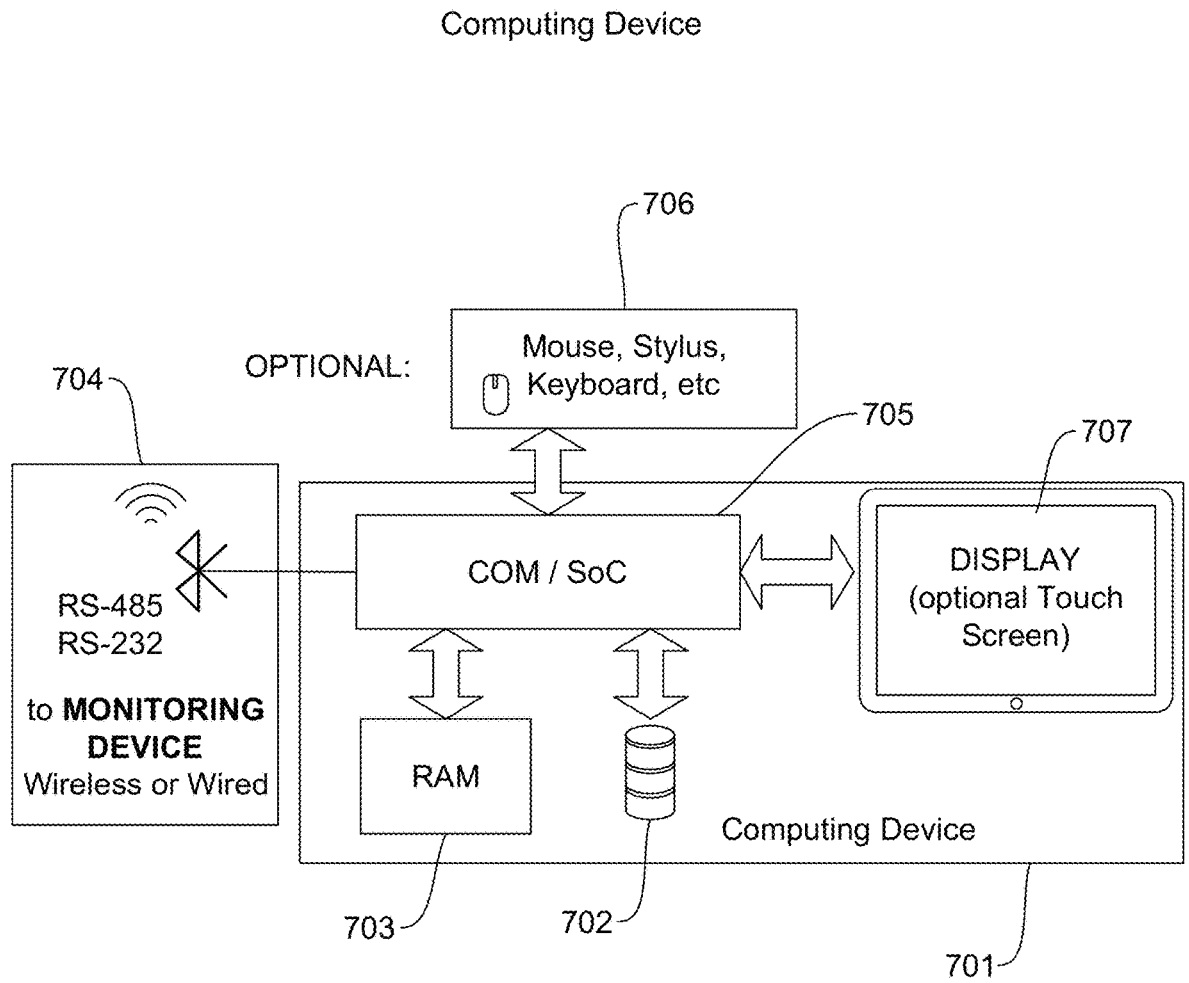
FIG. 7 illustrates a Computing Device configured as a Local-Hub 301. In this example, it contains a database 702 to store all the initial parameters, and measurement data. A communication device 704 is used to communicate with each Monitoring Device. The SoC 705 will process the information in the Database and display the results FIG. 1 or FIG. 2 on the Display 707 to represent the foundations condition (using Badges), shape or movement at each location. Optional human interfaces 706 can be connected to it for configuration and for inputting or requesting the parameters or data from the database 702. Alternatively the display 707 could be a touch screen.

The present invention comprises a system for monitoring the angular movement of a structure's foundation, wall, beam and/or column with one or more monitoring devices 302 in communication with either a local computing device (a hub) 301 that displays FIG. 1 and FIG. 2 the current angular deviation and direction from an initialized state, a remote server 502 capable of generating a web page display of the current angular deviation and direction from an initialized state, or both. Additionally, the hub 301 can be connected to the internet where data from its monitoring devices 302 can be shared with a remote monitoring service.

Each monitoring device 302 is a small circuit board containing a MEMS sensor 606 to detect tilt and optional indicator 602 to alert when limits are reached. When more than one monitoring device 302 is attached to the foundation the data transmitted is used to determine and/or indicate the bending of the foundation. With an optional targeting device, such as a camera or directional radio, is integrated with the monitoring devices, and the devices are in each other's view, then relative movement in translation between sections of the foundation can also be detected. Each monitoring device 302 would be attached to the foundation, typically around the perimeter. When the monitoring devices are in communication with a hub 301 or off-site server 502, a representation of the foundations change in shape can be displayed FIGS. 1 & 2 on the hub 301 or via a web page generated by the hub 301 or off-site server 502. Additionally, historical data may be logged at the hub 301, off-site server 502, or both. When configured, this data can be remotely accessed by credentialed individuals, such as a foundation repair provider or homeowner, via a web page or a smart phone or tablet app. Testing showed that a battery 1203 the size of a US quarter provides enough reserve charge to measure and transmit the data for up to 4 days with no charging. The addition of a 5 square inch solar panel 1201 provides more than enough charge to maintain the battery 1203, even in the shade. Larger batteries would provide more power reserve.

II. Monitoring Device Configurations

Figure 12:
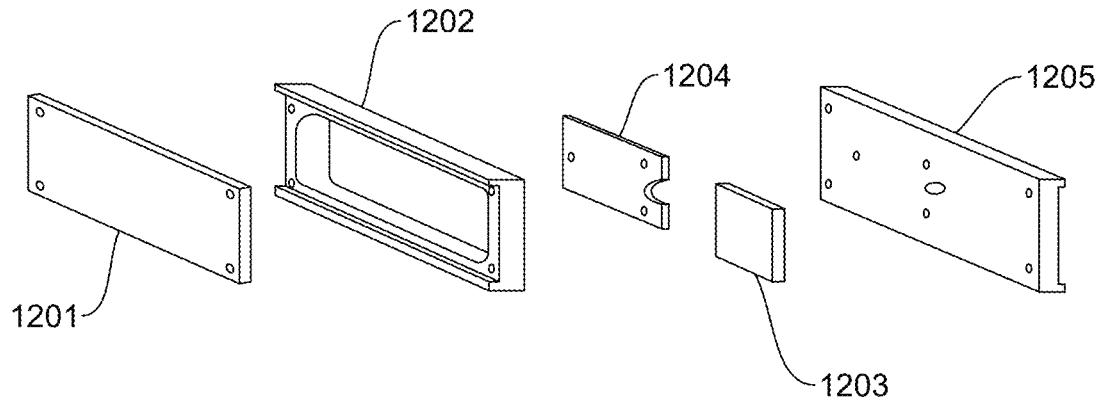
FIG. 12 illustrates an exploded view of a Monitoring Device using an M-Board 1204. An M-Board 1204 contains all the components shown on the PCB 601 in FIG. 6. The Bracket 1205 would first be attached to the foundation using a nail or Tapcon 1503 screw through the center hole. The ridges along two edges of the Bracket 1205 allow for the bracket to strain a small amount in order to maintain a preload against the foundation to prevent rotating or movement after install. Then the M-Board 1204 would be attached to the Bracket 1205, with the battery 1203 connected to it. The battery 1203 may be loose in the frame 1202, and screws threaded into the bracket 1205 would hold the frame 1202 and Solar Panel 1201 in place creating a drip proof seal that protects the M-Board 1204 and Battery 1203. Alternatively, the Solar Panel 1201 could be held in place with a snap-in feature on the frame 1202. Not shown until
Figure 13:
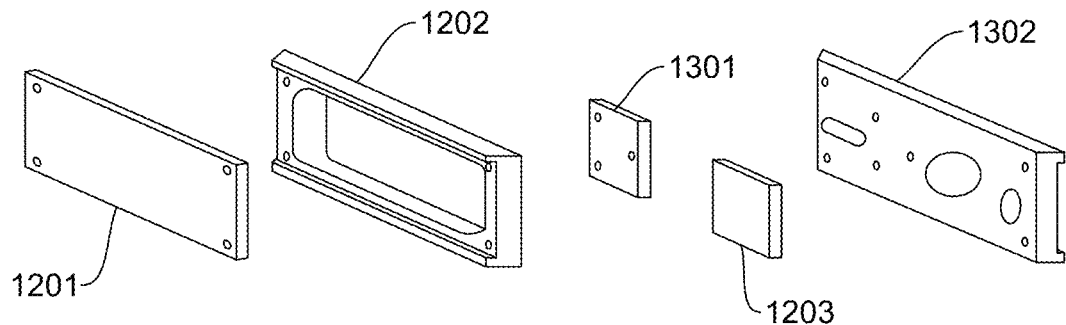
FIG. 13 illustrates an exploded view of another Monitoring Device 302 that can use either an M-Board 1204 or E-Board 1301. This bracket 1302 has three ping pins (shown in FIG. 16) to which two of the edges of an M-Board 1204 can be seated as a means to ensure a repeatable assembly that produces repeatable references when replacing an M-Board 1204. The bracket 1302 and frame 1202 are beveled on its sides to deflect any strikes during yard work. For added strength, two Tapcon 1503 screws are used (shown in FIG. 15). When an E-Board 1301 is used, this Bracket 1302 could be glued. When an M-Board 1204 is used, the ridges along two sides allow for strain that preloads the mounting force and protects the assembly from rotation. In the Case of an E-Board 1301, the S-Chip would be embedded into the foundation making the mounting of the Frame 1202 and Bracket 1302 less critical.
Figure 14:
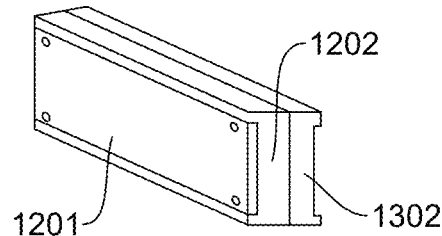
FIG. 14 illustrates how both types of monitoring devices would appear after assembly. The different types of Brackets (1205 and 1302) are interchangeable.
Figure 15:
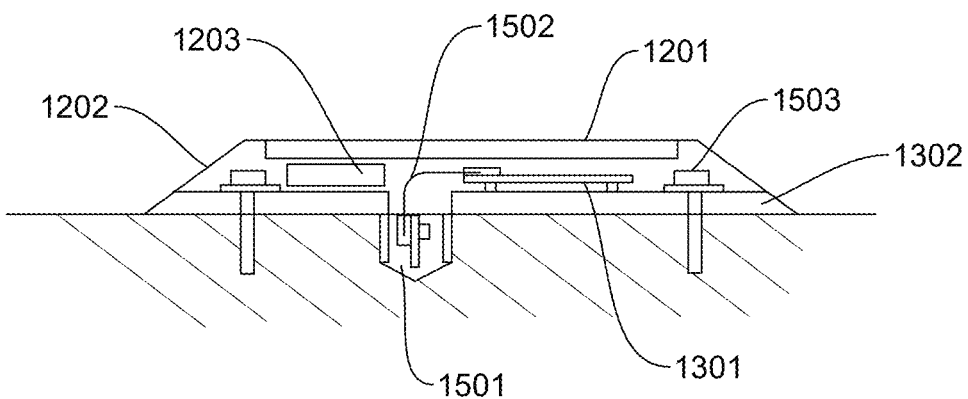
FIG. 15 illustrates a cross-sectional view of how a Monitoring Device 302 is equipped with an E-Board 1301 and Sensor Cartridge 1501 connected with a flat cable 1502 is assembled and mounted
Figure 16:
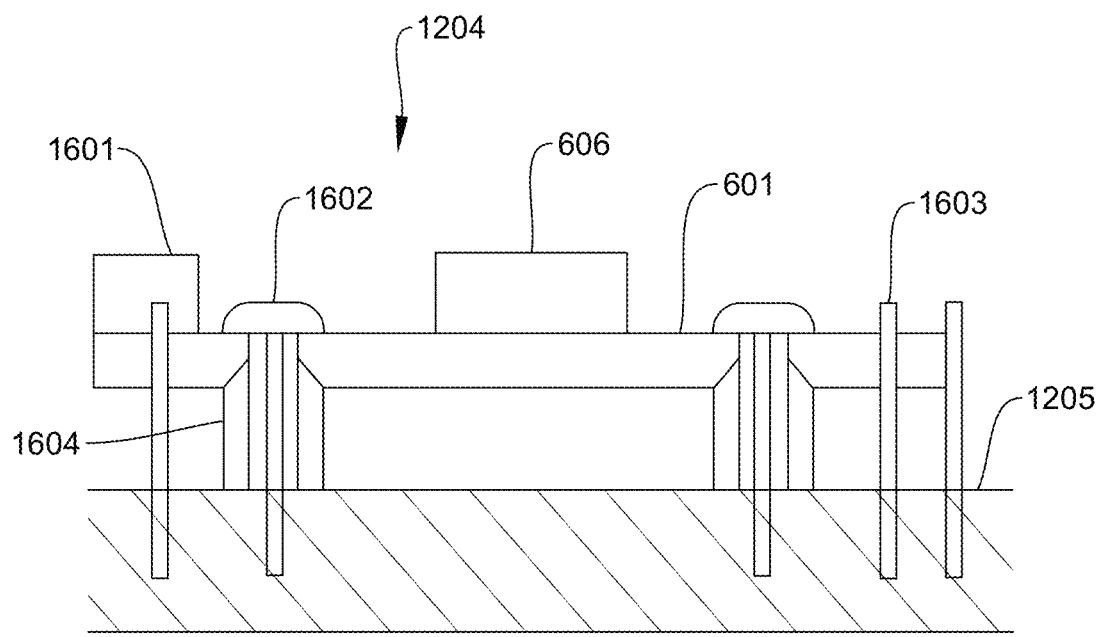
FIG. 16 is an optional feature on the bracket 1205 that provides three pins 1603 to which two of the edges of the M-Board 1204 can be seated as a means to ensure a repeatable assembly that produces repeatable references when replacing the M-Board 1204.

FIGS. 12 thru 15 depict various configurations of the Monitoring Device. The differences between them are the types of mounting that offer different types of protection for the S-Chip and means to maintain the integrity of the setup. FIG. 12 is a Monitoring Device utilizing an M-Board 1204 where the S-Chip 606 is mounted on the M-Board 1204 and with all the electronics completely contained inside the monitoring device. FIG. 13 depict a configuration where the sensitive S-Chip 606 is embedded into the foundation offering protection in the event that the Monitoring Device is struck by some external force. The Monitoring Device for this configuration would use an E-Board 1301 to communicate with the S-Chip 606. Being embedded, the S-Chip 606 setup is not disturbed so there is no change in the initial measurement reference. The S-Chip 606 is mounted on a S-Board 1703/1903 which could be directly inserted into the foundation, or part of a sensor cartridge 1501. FIG. 13 depicts a Monitoring Device configuration incorporating a Mounting Bracket 1302 that is compatible with either an M-Board 1204 or E-Board 1301. The unique features offered by these configurations are:

1) Protection of a delicate S-Chip 606 by embedding it into the foundation. A flexible cable 1502 connecting it to the E-Board 1301 will prevent damage to this critical component after it installed and its reference for future readings remain intact.
2) Finger connectors on supporting circuit (not shown) contact pads on solar panel for ease of assembly.
3) The Battery 1203 does not have to be secured, allowing various battery configurations for simple replacement and installation.
4) Solar panel 1201 clips or screws onto the bracket, creating a drip proof seal for the protection of the electronics.
5) The S-Chip 606 can be either part of the M-Board 1204 or separately inserted into the foundation 1501 and connected to an E-Board 1301 allowing for multiple cost benefit properties.
6) As shown in FIG. 12 and FIG. 13, the bevel of the Mounting Bracket 1205/1302 and Frame 1202 deflect external strikes preventing damage the Monitoring or moving the S-Chip 606 from its initial reference position.
7) With a sensor cartridge 1501, the datum reference is unchanged if plate is completely knocked off the foundation. The cable 1502 between the E-Board 1301 and Cartridge 1501 would slip from the connecters at either end avoid stress that could change the initial reference of the S-Board 1703.
8) The mounting spacers 1604 and pins 1603 locating the M-Board 1204, as shown in FIG. 16, ensures repeatable referencing in the event of replacement or exchange of said M-Board. The features shown in FIG. 16 show how the spacers 1604 and pins 1603 prevent bending stress to the M-Board PCB 601 which could otherwise affect the accuracy of the S-Chip 606. For example the holes in the PCB 601 of the M-Board are countersunk to receive conical end of spacers 1604 allowing each spacer to find its natural position without straining the board. The extra clearance in spacers 1604 allow them to move with respect to the screws 1602 which are fixed in place with threaded holes in the Mounting Bracket 1205. The pins 1603 are used to set the position of the M-Board 1204 on the Mounting Bracket 1205 in a repeatable way that does not induce stress. Two pins 1603 contact one edge of the M-Board 1204 and a third optional pin contacts another edge normal to the first edge.

III. Monitoring Devices

Each monitoring device regardless of configuration, incorporates a MEMS sensor (S-Chip) 606 to detect tilt, angular deviation and direction from an initialized state, and optionally an indicator 602 to alert when limits are reached. The circuitry could be either be on one PCB 601 known as an M-Board 1204, or an E-Board 1301 with a separate S-Board 1703/1903 containing the S-Chip 606. Each Monitoring Device 302 may be programmed to sleep until it is time to wake and take a reading and transmit it. Each device is programmed to read a burst of measurements from each axis, and optionally analyze the set of readings to determine the integrating of the readings and final value for each axis before sending to the Local-Hub 301 and or the off-site server 502. If the Monitoring Device does not do the optional analysis of the data burst, all the data is sent to the Local-Hub 301 or remote server 502 for analysis. At the Local-Hub or remote server, the initial settings of the measurement axes of the S-Chip 606 associated with the Monitoring Device 302 are known and translated into the projections on the X, Y and Z axes when representing the point of interest on the foundation. After the data is sent from the Monitoring Device 302, it puts itself to sleep until its programmed time to measure and send more data. For the system results shown in FIG. 2, the data received was used to determine and/or indicate the bending of the foundation as reflected in the Badges displayed near the middle each wall. With an optional targeting system between adjacent Monitoring Device that are in line of site, the relative movement in translation between their sections of the foundation can also be detected.

IV. Mounting the Monitoring Device

As shown in FIG. 12 through FIG. 20 the Monitoring Device 302 may configured for different means of mounting. Each monitoring device is normally attached to the foundation, typically around the perimeter as shown in FIG. 2. When the monitoring devices are in communication with a hub 301, or off-site server 502, a representation of the foundations change in shape can be displayed on the hub or via a web page generated by the hub 302 or off-site server 502 as shown as examples in FIG. 1 and FIG. 2. Additionally, historical data may be logged at the hub 301, off-site server 502, or both. When configured, this data can be remotely accessed by credentialed individuals, such as a foundation repair provider or homeowner, via a web page or a smart phone or tablet app. Testing showed that a battery 1203 the size of a US quarter provides enough charge to measure and transmit the data for up to 4 days. The addition of a 5 square inch solar panel 1201 provides more than enough charge to maintain the battery, even in the shade. Larger batteries would provide more power reserve.

V. Monitoring System Configuration

Figure 8:
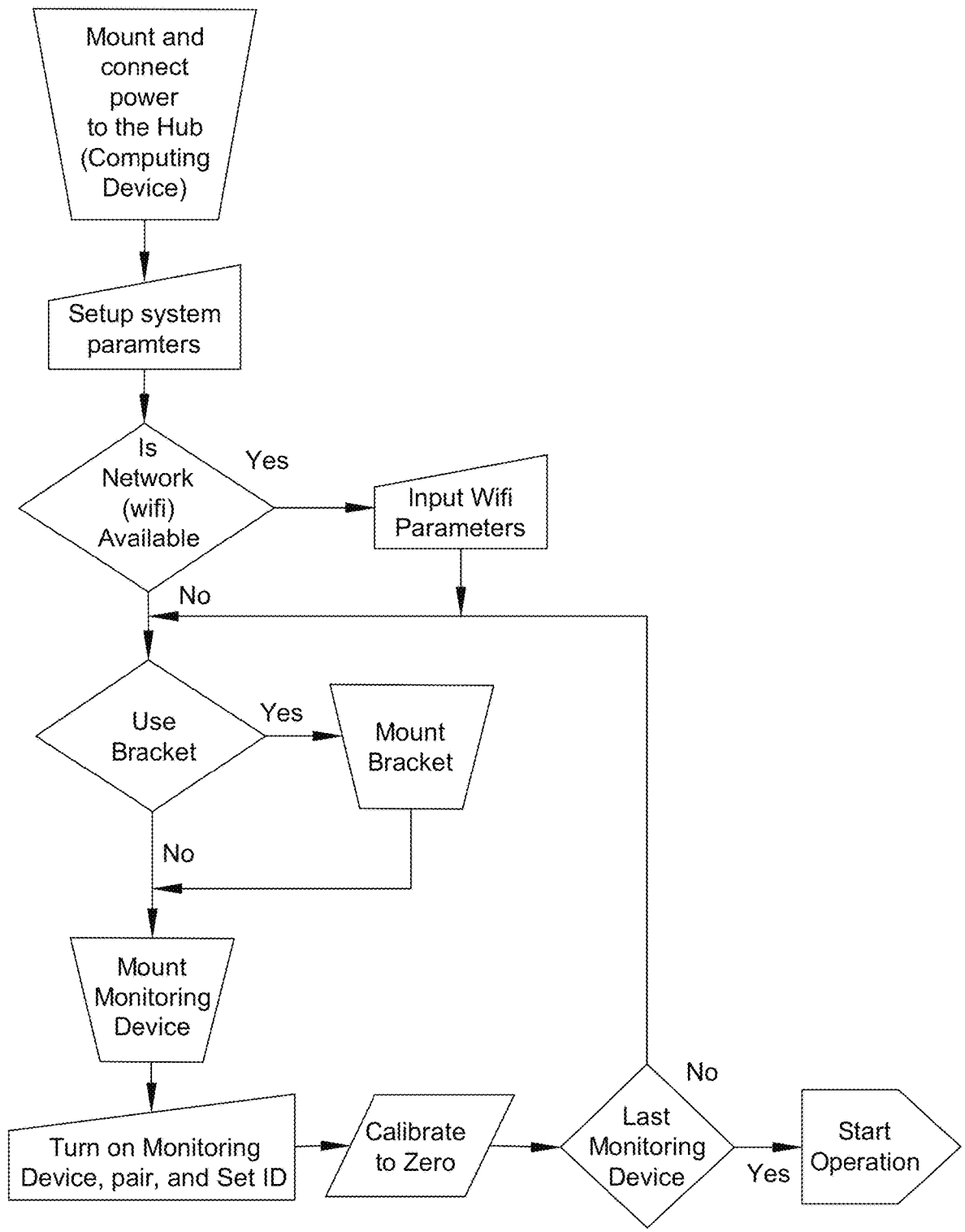
FIG. 8 illustrates the process of configuring a system to monitor a foundation. In this case the System is one that uses a Local-Hub 301 (Computing Device FIG. 7).

FIG. 8 shows a flow diagram of how the Monitoring System gets configured after its monitoring devices 302 are mounted to the foundation as described above.

VI. Monitoring System Operation

Figure 9:
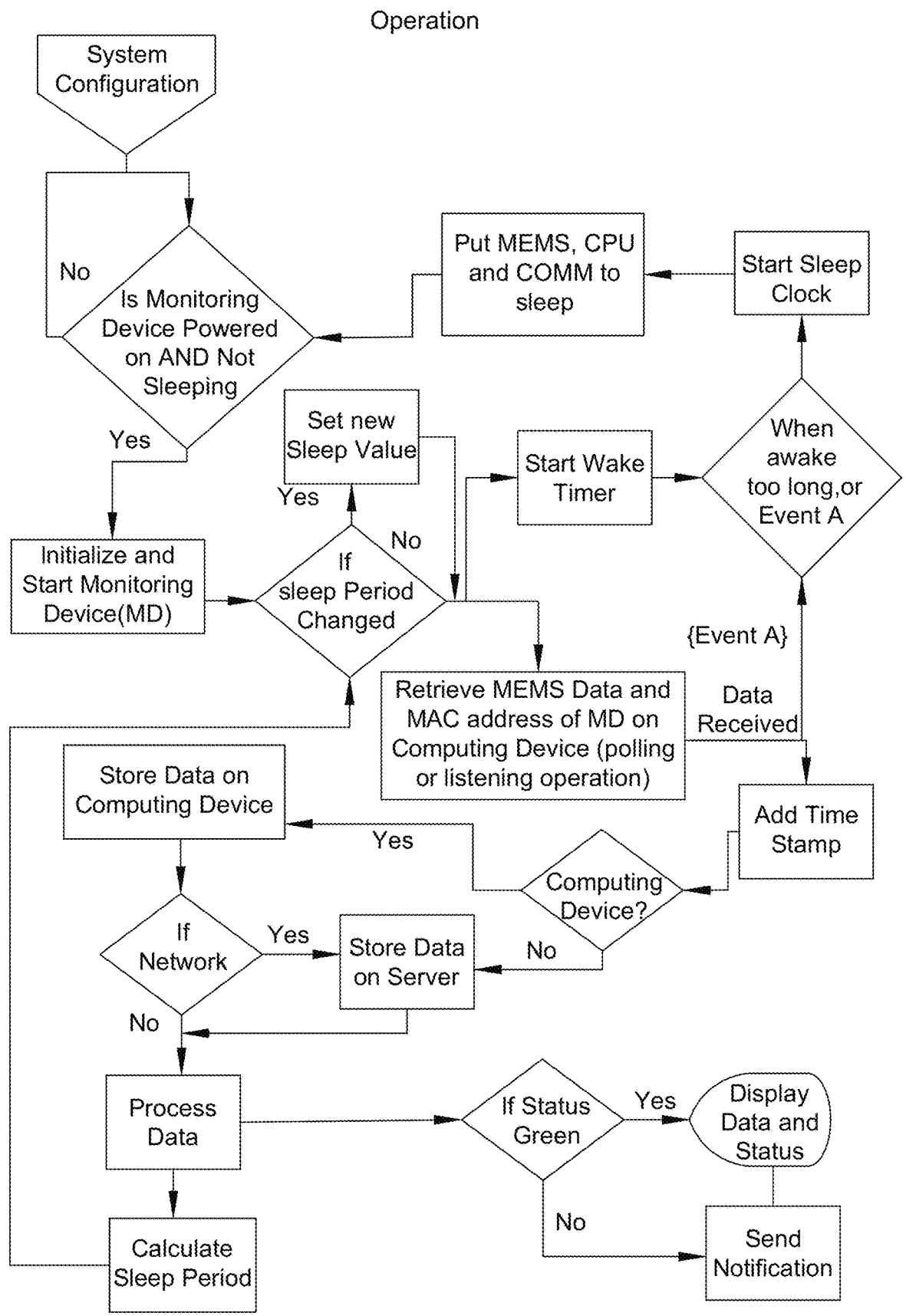
FIG. 9 illustrates the actual operation of the monitoring system after it is configured.

FIG. 9 shows a flow diagram of the Monitoring System in operation after the monitoring system is configured. Each monitoring device is programmed to send a short burst of tilt data to either the hub 301, offsite server 502 or both and then go to sleep.

VII. Remote & Local Database Structure

Figure 10:
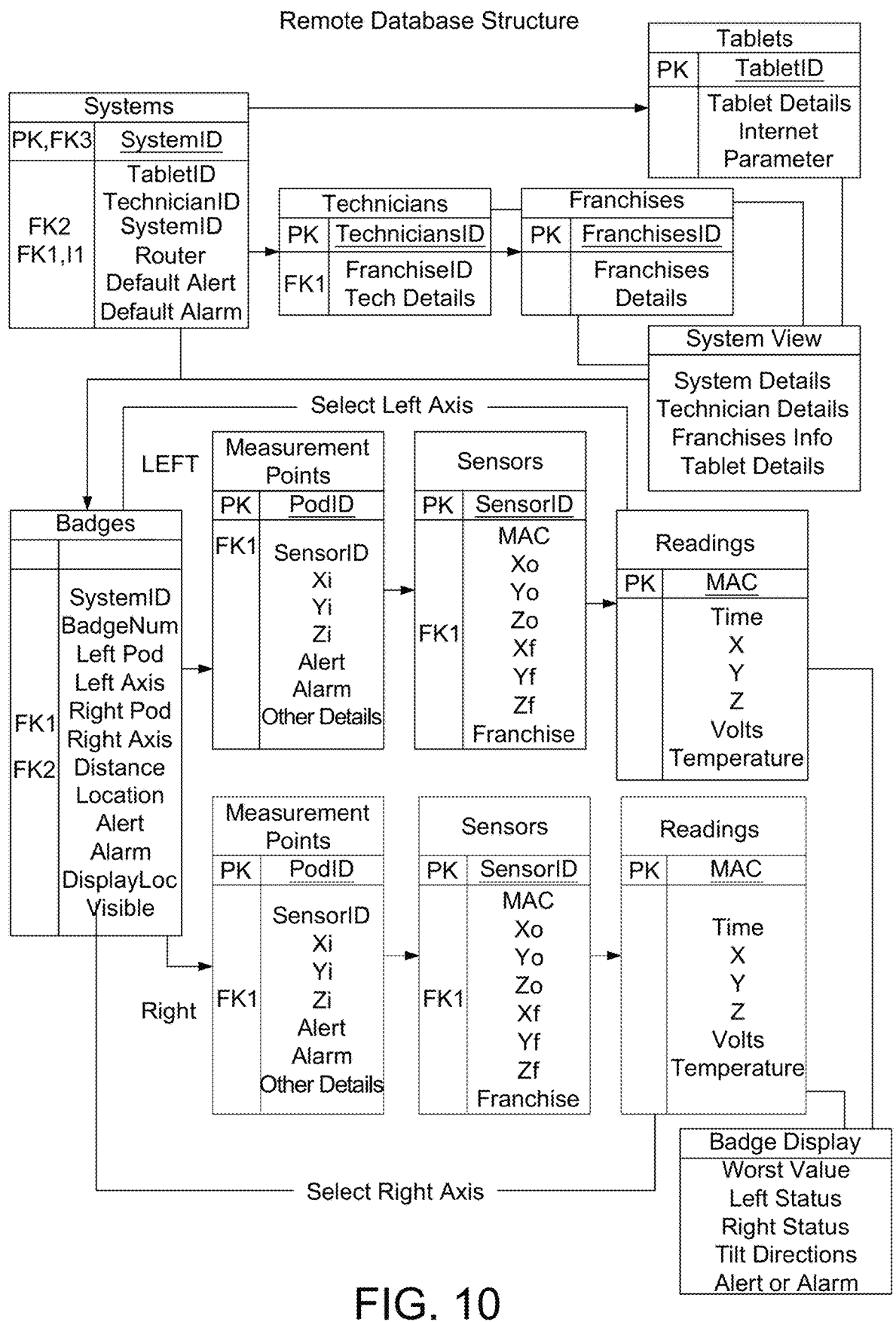
FIG. 10 illustrates an example of the database structure of a Remote Database. A local database stored on a Local-Hub would be similar but without a Systems Table as shown in FIG. 11.
Figure 11:
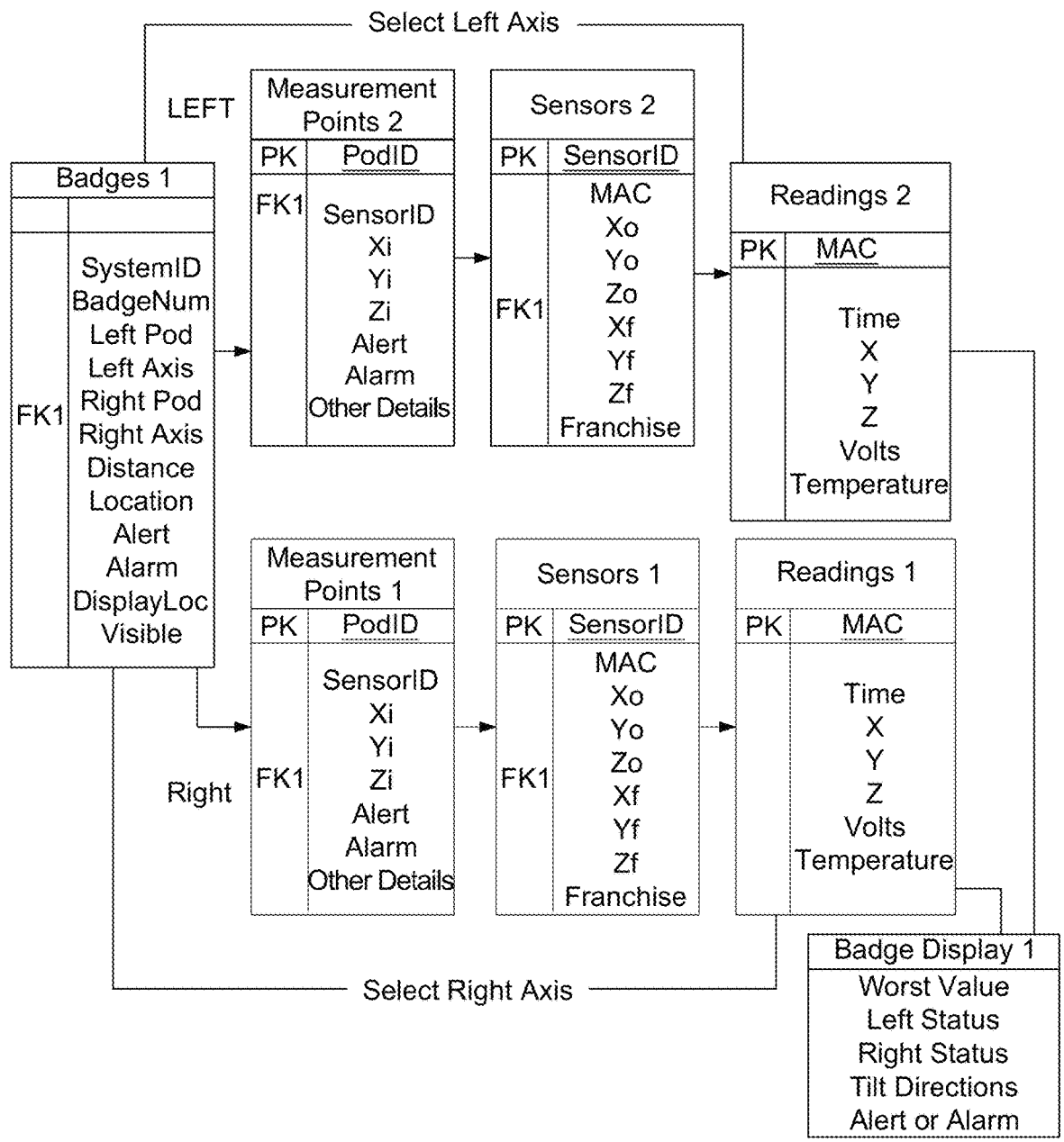
FIG. 11 illustrates an example of the database structure of a Local-Hub Database.

FIG. 10 and FIG. 11 show the preferred embodiment database structures, for the capture and storage of historical data. This structure may be implemented in a traditional relation database, name & value pairs, or in text file or xml files.

The following are claimed:

1. A system for periodically measuring the angle and bending of a structure's foundation, the system comprising:
at least two monitoring devices attached at different locations on a building's structure to be monitored, so that each monitoring device moves as each said location on the structure moves;
each monitoring device comprising of an angle sensor that detects its angular position in at least one measuring axis, a communication interface, random access memory (RAM), non-volatile storage and at least one indicator, all of which are connected to a micro controller (MCU);
said monitoring devices being powered by at least one electric power source;
said MCU on each monitoring device configured to periodically read angle data from the angle sensor, transmit and receive said data with another monitoring device thru their said communication interfaces, write said data to non-volatile storage, compare said data with historical data to separately calculate how much the building's structure has bent between monitoring devices and how much building's structure has tilted at each monitoring device, and activate an indicator when any said mode of movement reaches a preset limit.

2. The system of claim 1 where each monitoring device is connected to a common separate computing device connected thru a communication interface;

said computing device comprising of a display screen, system on chip (SoC), random access memory (RAM), non-volatile storage, a communication interface; and being powered by at least one electric power source;

each monitoring device being configured to periodically transmit raw data to said computing device, said data containing at least one axis of the angle sensor's data, and the monitoring device's unique identifier;

said SoC on the computing device being configured to create a separate record for each periodic set of data received from any monitoring device;

said record comprising of the angle data, the monitoring device's unique identifier, additional data from the computing device; and store each record in a file resident in the computing device's memory;

said computing device using said records to separately calculate how much the building's structure has bent between monitoring devices, and how much building's structure has tilted at each monitoring device.

3. The system of claim 2 where the computing device further comprises of a user input device such as a keyboard, touch display screen, mouse, stylus or any combination thereof.

4. The system of claim 3 where the computing device's user input device is used to configure the monitoring device.

5. The system of claim 2 where the computing device is further being capable displaying on its display screen various representations of the records found in the data file in a way that illustrates the angular rotation of the measured points on a structure's foundation, and the bending between those points, or any combination thereof.

6. The system of claim 2 with a program on the computing device to compensate for the effects on the measurements caused by any combination of some or all of the forces due to the earth's rotation, sun and moon.

7. The system of claim 2 further comprising of a network connection between the computing device, and an offsite computer system, said network connection capable of transferring data between the monitoring device and the offsite computer system.

8. The system of claim 7 where the offsite computer system can trigger a monitoring device to wake-up, if asleep, and transmit a new reading through the computing device to the offsite computer system.

9. The system of claim 2 where the computing device triggers at least one monitoring device to wake-up, if asleep, and transmit a new reading to the computing device.

10. The system of claim 1 where the power source for each monitoring device comprises of its own dedicated solar panel, charging circuit, and battery, with said solar panel and charging circuit connected in parallel to said battery.

11. The system of claim 1 where each angle reading is based on the average of a burst of several measurements from the angle sensing device, and accepted as a valid steady-state reading only when there is no deviation between the measurements of said burst and the reading is within an expected range.

12. A system for periodically measuring the angle, bending, and shifting of a structure's foundation, the system comprising:

at least two monitoring devices attached at different locations on a building's structure to be monitored, so that each monitoring device moves as each said location on the structure moves;

each monitoring device comprising of an angle sensor that detects its angular position in at least one measuring axis, a communication interface, random access memory (RAM), non-volatile storage and at least one indicator, all of which are connected to a micro controller (MCU);

at least one monitoring device also comprising a targeting sensor connected to it's MCU, said targeting device having at least one other monitoring device in its view;

all said monitoring devices being powered by at least one electric power source;

said MCU on each monitoring device being configured to periodically read angle data from its angle sensor, transmit and receive said angle data thru said communication interfaces to a monitoring device having a targeting sensor;

those MCUs on monitoring devices having a targeting sensor further configured to determine the position of another monitoring device in its view, write the angle and targeting data to non-volatile storage, compare said data with historical data to separately calculate how much the building's structure has bent between monitoring devices, how much said structure has tilted at each monitoring device, the amount of relative translation between said monitoring devices, and activate an indicator when any said mode of movement reaches a preset limit.

13. A system for periodically measuring the angle and bending of a structure's foundation, the system comprising:

at least one computing device and at least two monitoring devices;

each monitoring device attached at different points of a building's structure to be monitored, so that each monitoring device moves with said structure at its attached location;

each monitoring device comprising of a micro controller (MCU) connected to an angle sensor and a communication interface;

said angle sensor being a device that detects its angular position in at least one measuring axis;

said computing device comprising of-random access memory, non-volatile storage, and communication interface; all of which are connected to a System on Chip (SoC);

said computing device and each monitoring device being powered by an electric power source;

each monitoring device being configured to periodically read angle data from its angle sensor and transmit said angle data along with the monitoring device's unique identifier to said computing device, wherein the computing device creates a separate record each time information is received from a monitoring device;

said record comprising of angle data from at least one axis and the monitoring device's unique identifier;

each said record being stored in a file resident in the computing device's non-volatile storage;

said computing device comparing records created at different times to separately calculate how much the building's structure has bent between monitoring devices, and how much it has tilted at each monitoring device.

14. The system of claim 13 where at least one monitoring device also comprises a targeting sensor connected to it's MCU, said targeting device having at least one other monitoring device in its view, and those MCUs connected to a targeting device being configured to included target data when transmitting data to the computing device, said computing device including target data in the records it creates for those monitors that send target data;

said computing device comparing records created at different times to separately calculate how much the building's structure has bent between monitoring devices, how much the said structure has tilted at each monitoring device, and the relative translation between monitoring devices.

15. The system of claim 13 where the computing device is an off site remote server delivering a web page showing the results of its calculations.

16. The system of claim 13 where the computing device is a local hub which has a screen to display the results of its calculations.

17. The system of claim 13 where the computing device transmits an electronic notification to a recipient when any mode of movement exceeds a predetermined limit.

* * * * *